Feb. 11, 1936.  W. N. GILBERT  2,030,444
WEIGHING AND COUNTING SCALE
Filed May 19, 1932  2 Sheets-Sheet 1
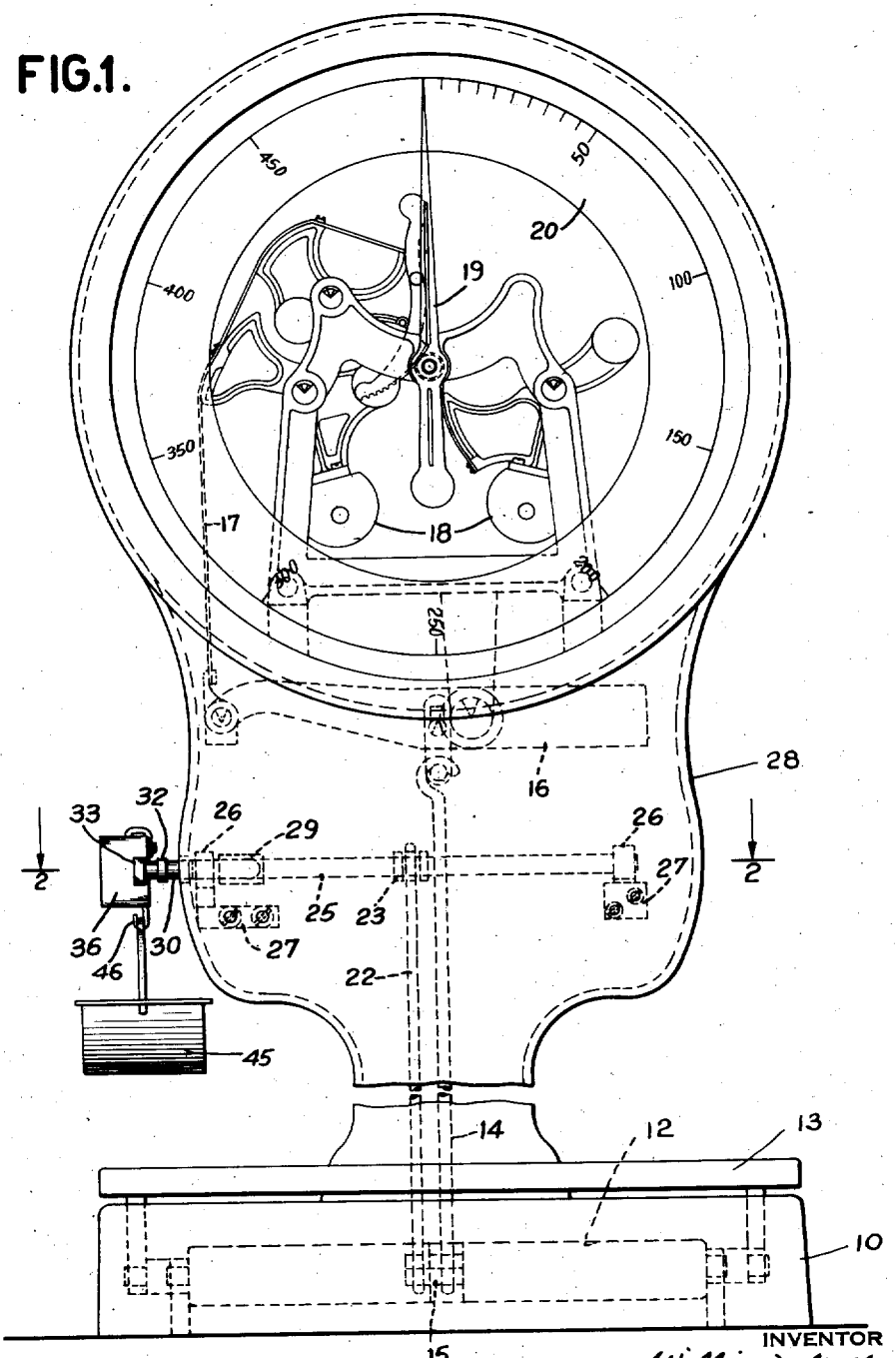

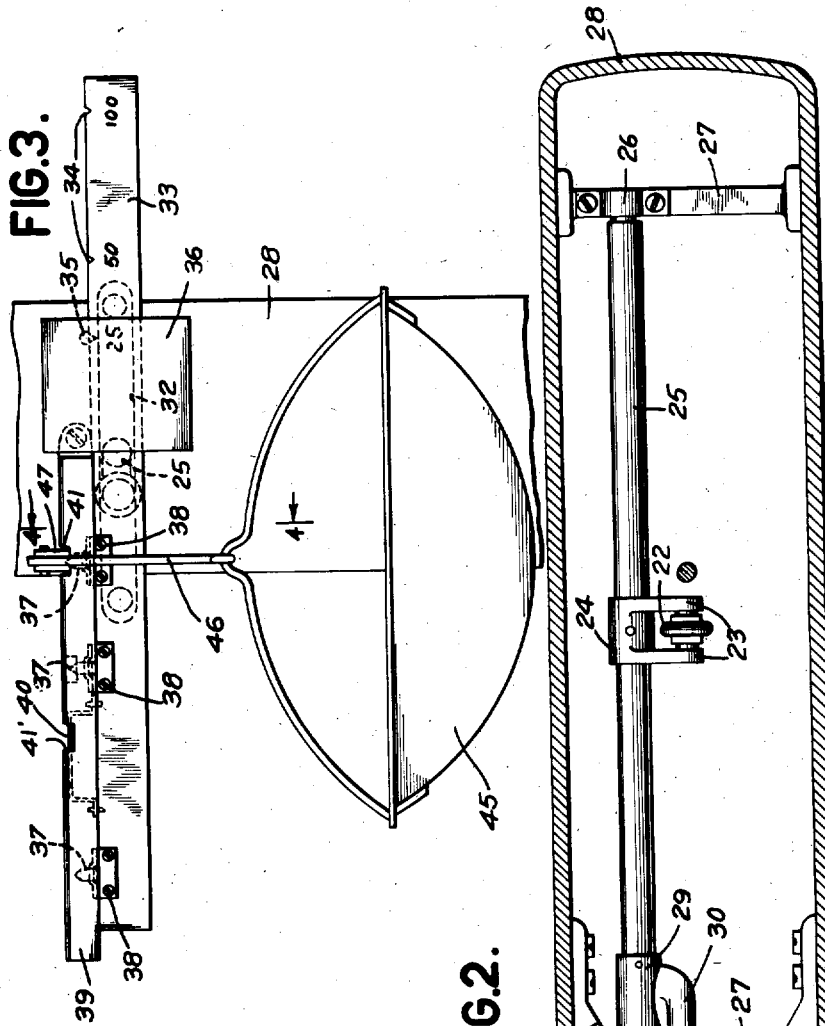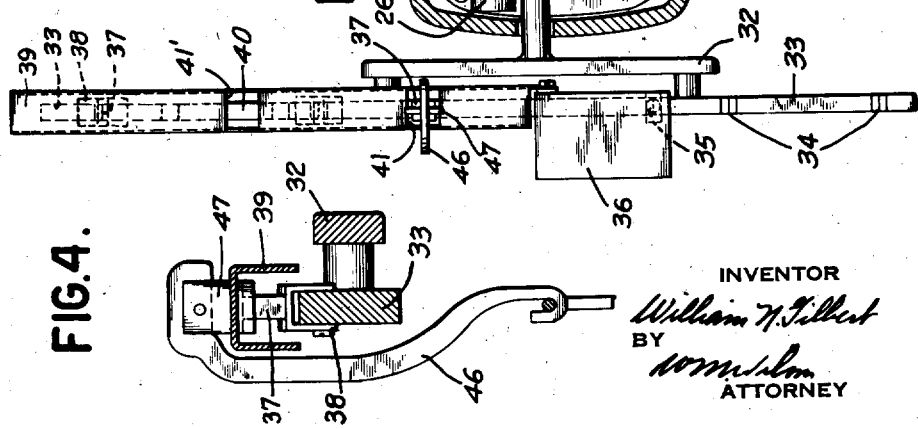

Patented Feb. 11, 1936

2,030,444

UNITED STATES PATENT OFFICE 2,030,444

WEIGHING AND COUNTING SCALE

William Nathan Gilbert, Hudson Heights, N. J., assignor, by mesne assignments, to International Business Machines Corporation, New York, N. Y., a corporation of New York Application May 19, 1932, Serial No. 612,274

8 Claims. (Cl. 265—30)

This case relates to weighing and counting scales.

The object of the invention is to provide an improved counting device and arrangement thereof in a scale.

Further, the object of the invention is to provide an improved counting bar with means for preventing an inaccurate adjustment of the counting bar.

Further and other objects and advantages will be hereinafter set forth in the accompanying specification and claims, and shown in the drawings, which by way of illustration show what is now considered to be the preferred embodiment of the invention.

In the drawings:

Fig. 1 is a front view of the scale;

Fig. 2 is a section on line 2—2 of Fig. 1;

Fig. 3 is a detail front view of the counting pan and beam, and,

Fig. 4 is a section on line 4—4 of Fig. 3.

Referring to the drawings in detail the scale comprises a base housing and frame 10 in which is enclosed and mounted a base lever 12 which supports the platform 13. The base lever 12 is connected by a draft rod 14 engaging the nose iron 15 of the lever at its lower end to an intermediate multiplying beam 16. The beam 16 is in turn connected by tape 17 to a pendulum system 18 and an indicator 19 which reads dial 20. Nose iron 15 of the base lever 12 also has a connection by means of a draft rod 22 to the crank arms 23 of a sleeve 24 pinned to a shaft 25 which extends transversely of the scale and in the same direction as lever 16. Shaft 25 is mounted at each end in bearings 26 carried by frame pieces 27 rigidly fixed to the intermediate housing 28. Adjacent its left hand end as viewed in Figs. 1 and 2, shaft 25 has fixed to it a sleeve 29 which carries a crank member 30 bent outwardly and then parallel to the shaft 25 to extend through a hole in the end of housing 28 exteriorly of the housing.

The crank extension 30 is formed at its free outer end with an integral plate-like bracket 32 to which is secured the counting beam 33. The beam extends at right angles to the shaft 25 and also to the front of the scale and the dial 20. At its right hand end as viewed in Fig. 3, the tare and counting beam 33 has three V-shaped notches 34 for receiving the locating knife edge 35 of the poise 36. On its left hand arm, beam 33 is provided with three knife edges 37 carried by blocks 38 fixed to the beam 33. Poise 36 at its left end is pivotally connected to a U-shaped bar 39 which is guided for slidable movement along lever 33 by means of a U-shape frame 40 secured to the left hand arm of beam 33. U-shaped bar 39 has two notches 41 and 41' therein, the purpose of which will be later brought out. Knife edges 37 are at distances from the fulcrum or axis of beam 33 (which is determined by the axis of shaft 25) which match with the arrangement and distances of knife edge grooves 34 in the right hand arm of beam 33. A counting pan 45 is supported upon a hook 46 which is pinned to a block 47 having a V-shaped knife edge groove for resting on the knife edges 37. When poise 36 is in the position shown in Fig. 3, the notch 41 in bar 39 is above and exposing the knife edge 37 which is closest to the fulcrum of beam 33. The counting pan 45 and its hook 46 may then be lifted and its bearing block 47 placed on this knife edge 37. In this position of the pan, one article therein will counteract twenty-five of the same articles on the platform. The other knife edges 37 are covered so that the pan may not be placed thereon.

When the poise is moved to the second notch 34, it carries the bar 39 along with it, covering up all the knife edges 37 except the second one. The pan 45 may then be placed on this knife edge and an article therein will counteract fifty of the same articles on the platform.

When the poise is moved to the third notch 34, it carries the bar 39 with it to cover all but the third knife edge 37. One article in the counting pan when the pan is associated with this knife edge 37 counteracts one hundred of the same articles on the platform.

In each position of the poise 36, it balances the weight of the pan 45, hook 46, and block 47 so that the only effective weight acting on bar 33 is that of the article or articles in pan 45. Only one of the counting ratios, 25 to 1, 50 to 1, and 100 to 1 is available at any one time, the others being automatically rendered ineffective for use by the U-shaped bar 39 which is operated by the poise 36.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. In a device of the class described, a platform, a base lever operated thereby, automatic counterbalancing and indicating mechanism operated by said lever, a housing for said mechanism above the platform, a counting lever responsive to movements of the base lever and extending at substantially right angles to the front of the housing, and a ratio pan carried by said counting lever.

2. In a device of the class described, a platform, a base lever operated thereby, automatic counterbalancing and indicating means operated by the base lever, a housing for said mechanism, a member within the housing having an axis extending substantially parallel to the front of said housing and rockable on said axis in response to movement of the base lever, an extension of said lever outside the housing, and load counteracting means carried by said extension.

3. In a device such as defined in claim 2, said member comprising a shaft rotatably supported at opposite ends by the housing.

4. In a device of the class described, a counting lever having a plurality of pivot devices, each located to provide a different counting ratio, a poise carried by one arm of the lever, a ratio pan carried by the other arm of the lever, the poise and ratio pan being structurally disconnected and free to move independently of each other along the lever, said poise being movable to different positions in each of which it is adapted to balance the weight of said pan when the pan is in coaction with one of said pivot devices, and a device for preventing coaction of the pan with a pivot device except when said pivot device locates the pan in the position in which it is balanced by said poise.

5. In a device of the class described, a counting lever having a plurality of pivot devices, each located to provide a different counting ratio, a poise carried by one arm of the lever, a ratio pan carried by the other arm of the lever, said poise being movable to different positions in each of which it is adapted to balance the weight of said pan when the pan is in coaction with one of said pivot devices, and a device for preventing coaction of the pan with a pivot device except when said pivot device locates the pan in the position in which it is balanced by said poise, said preventing device comprising a member operated by the poise for covering all but one of said pivot devices at a time.

6. In a device of the class described, a counting lever having a plurality of pivot devices, each located to provide a different counting ratio, a poise carried by one arm of the lever, a ratio pan carried by the other arm of the lever, said poise being movable to different positions in each of which it is adapted to balance the weight of said pan when the pan is in coaction with one of said pivot devices, and a device for preventing coaction of the pan with a pivot device except when said pivot device locates the pan in the position in which it is balanced by said poise, said preventing device comprising a member having notches cut out to expose only one of said pivot devices at a time.

7. In a scale, a beam having a plurality of stationary locating points spaced apart predetermined distances along the length of the beam, a device for selecting only said points and movable to different positions, in each of which it selects a different one of said locating points for operation and renders the remaining such points ineffective, and a weight-carrying structure supported by the beam at a selected locating point independently of the said device and also structurally disconnected from said device to allow it to be moved to the selected locating point separately from and after the movement of the device to select the locating point.

8. In a scale, a beam having a plurality of locating points spaced apart predetermined distances along the length of the beam and a corresponding number of bearing elements, each set at one of said locating points, a device movably mounted on the lever for adjustment to different positions in each of which it selects a different one of said bearing elements for operation and renders the remaining bearing elements ineffective, and a weight-carrying structure having a bearing element for engaging with the selected one of the first-mentioned bearing elements to rockably support said structure on the beam independently of the said device.

WILLIAM N. GILBERT.